United States Patent
Berg et al.

(10) Patent No.: US 11,714,015 B1
(45) Date of Patent: Aug. 1, 2023

(54) METHOD FOR THERMOELECTRIC EFFECT ERROR CORRECTION

(71) Applicant: Rosemount Aerospace Inc., Burnsville, MN (US)

(72) Inventors: Brandon T. Berg, Shakopee, MN (US); Brian A. Gilkison, Shakopee, MN (US)

(73) Assignee: ROSEMOUNT AEROSPACE INC., Burnsville, MN (US)

( * ) Notice: Subject to any disclaimer, the term of this patent is extended or adjusted under 35 U.S.C. 154(b) by 0 days.

(21) Appl. No.: 17/656,985

(22) Filed: Mar. 29, 2022

(51) Int. Cl.
*G01L 9/04* (2006.01)

(52) U.S. Cl.
CPC .................... *G01L 9/045* (2013.01)

(58) Field of Classification Search
CPC ... G01L 3/24; G01L 3/242; G01L 5/08; G01L 5/10; G01L 5/101; G01L 5/108; G01L 5/16; G01L 5/1627; G01L 5/167; G01L 5/22; G01L 5/28; G01L 23/085; G01L 23/20; G01L 5/0061; G01L 5/0071; G01L 5/008; G01L 5/06; G01L 5/171; G01L 7/106
USPC .................... 73/700–756
See application file for complete search history.

(56) References Cited

U.S. PATENT DOCUMENTS

| | | | |
|---|---|---|---|
| 4,399,515 A * | 8/1983 | Gross | G01R 17/06 73/714 |
| 5,253,532 A | 10/1993 | Kamens | |
| 6,107,861 A | 8/2000 | Mayer | |
| 6,973,837 B2 | 12/2005 | Barnett | |
| 7,334,483 B2 | 2/2008 | Sato et al. | |
| 7,647,837 B2 | 1/2010 | Moran et al. | |
| 7,669,455 B2 * | 3/2010 | Ohmi | G01L 9/065 73/1.62 |
| 9,470,585 B2 * | 10/2016 | Hong | G01K 7/22 |
| 2009/0299658 A1 * | 12/2009 | Hutchinson | G01L 27/002 702/50 |
| 2021/0033481 A1 * | 2/2021 | Szasz | G01L 27/002 |

FOREIGN PATENT DOCUMENTS

| | | | | |
|---|---|---|---|---|
| CN | 102047089 A * | 5/2011 | | G01L 9/125 |
| CN | 114509190 A * | 5/2022 | | |
| DE | 102015202029 A1 * | 8/2016 | | G01L 27/002 |

* cited by examiner

*Primary Examiner* — Andre J Allen
(74) *Attorney, Agent, or Firm* — Kinney & Lange, P. A.

(57) ABSTRACT

Apparatus and associated methods relate to sensing pressure and mitigating the error introduced by the thermoelectric effect. A pressure sensing device includes a pressure sensor, a temperature sensor, and an error correction device. The pressure sensor produces a voltage output proportional to a sensed pressure. The temperature sensor measures a first temperature at a first location and a second temperature at a second location to produce a temperature difference signal. The error correction device modifies the pressure output proportionally to the temperature difference signal to produce a temperature adjusted pressure output which compensates for error introduced from the temperature difference.

20 Claims, 4 Drawing Sheets

METHOD FOR THERMOELECTRIC EFFECT ERROR CORRECTION

BACKGROUND

Temperature differences across a sensor's electrical circuitry can produce a thermoelectric effect (also known as the thermocouple effect). The thermoelectric effect can result in sensor readings which are erroneous due to the influence of the temperature difference at various points across the electrical circuitry. The temperature difference may be in a steady-state condition where there is little volatility or may be subject to transient conditions. A system for mitigating the influence of the thermoelectric effect on a sensor's readings in any conditions is desirable.

SUMMARY

In one embodiment, a pressure sensing system includes a pressure sensor configured to produce a pressure sensor voltage output proportional to the sensed pressure. The pressure sensing system also includes a temperature sensor configured to measure a first temperature at a first location and a second temperature at a second location, wherein the temperature sensor is configured to produce a first temperature difference signal based on a difference between the first temperature and the second temperature. The pressure sensing system also includes one or more error correction components configured to modify the pressure sensor voltage output proportionally to the first temperature difference signal.

In another embodiment, a method for sensing pressure includes measuring a pressure output using a pressure sensor. The pressure sensor produces a pressure sensor voltage output proportional to the sensed pressure. The method for sensing pressure also includes measuring a first temperature at a first location and a second temperature at a second location using a temperature sensor, wherein the temperature sensor is configured to produce a first temperature difference signal. The method for sensing pressure also includes modifying the pressure sensor voltage proportionally to the first temperature difference signal using one or more error correction components.

DETAILED DESCRIPTION

Figure 1:
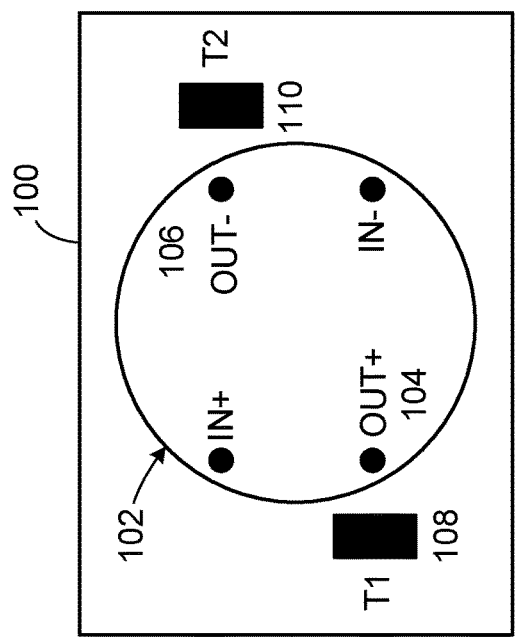
FIG. 1 is a perspective view of a layout of pressure sensing pins and temperature sensing pins for measuring a temperature difference across a pressure sensor.

This application relates to correcting errors that arise in a sensor due to a thermoelectric effect created by a temperature gradient. FIG. 1 is a perspective view of a layout of pressure sensing pins and temperature sensing locations for measuring a temperature difference across a pressure sensor.

In FIG. 1, sensing package 100 includes pressure sensor 102, first pressure sensing output pin 104, second pressure sensing output pin 106, first temperature sensor 108, and second temperature sensor 110. First pressure sensing output pin 104 and second pressure sensing output pin 106 are contained within pressure sensor 102. First temperature sensor 108 is located near first pressure sensing output pin 104 and second temperature sensor 110 is located near second pressure sensing output pin 106.

Pressure sensor 102 senses a pressure where a first differential output is sensed at first pressure sensing output pin 104 and a second differential output is sensed at second pressure sensing output pin 106. First temperature sensor 108 then measures a temperature at a first location near first pressure sensing output pin 104 and second temperature sensor 110 measures a temperature at a second location near second pressure sensing output pin 106. First temperature sensor 108 and second temperature sensor 110 combine to create a temperature difference signal. In some instances, a temperature difference across the pressure sensor may influence the pressure sensor reading due to thermocouple effects. Thermocouple effects may arise when the pressure sensing system includes electrical connections consisting of dissimilar metallic elements. In such instances undesirable thermocouple junctions may be created. A difference in temperature at these thermocouples can create an error voltage in the pressure signal. A known temperature difference allows for correction of the differential pressure output.

Sensing package 100 may be applied to any environment susceptible to thermocouple effects. In some embodiments, sensing package 100 may be mounted on ground or maritime systems. In other embodiments, sensing package 100 may be mounted on an air system where the temperature difference may have a significant effect on pressure sensor 102. In such an embodiment, environmental conditions, including temperature and pressure, may be constantly changing, and hence repeated adjustment of the pressure signal may be required.

Figure 2:
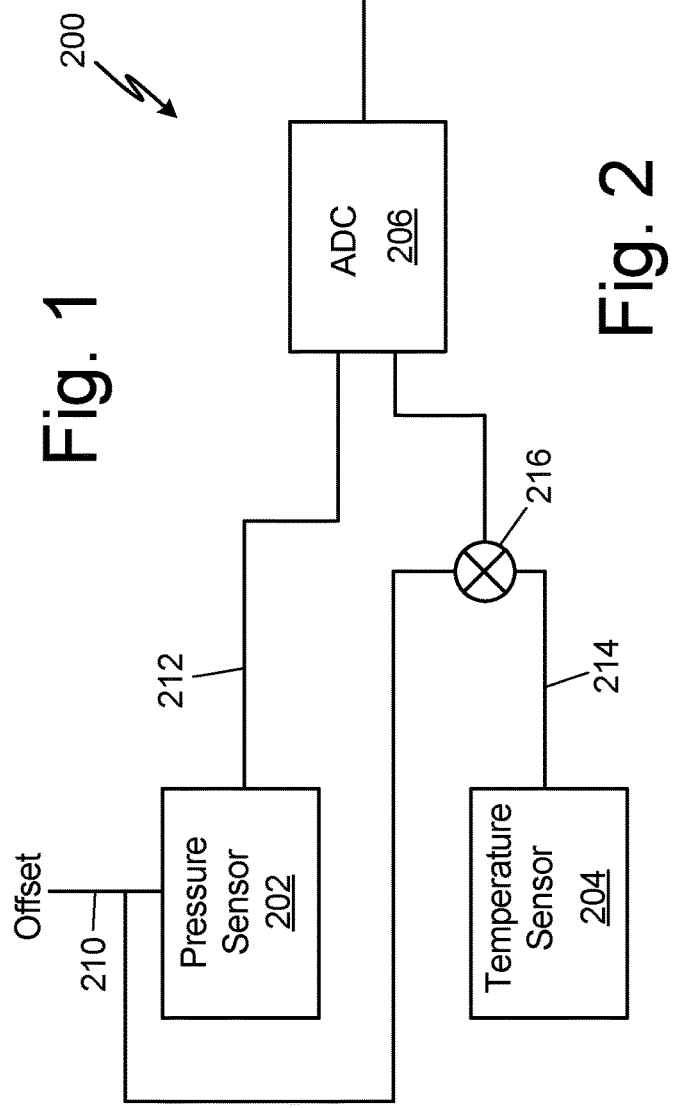
FIG. 2 is a black box diagram of the measurement and error correction system.

FIG. 2 is a black box diagram of measurement and error correction system 200. Measurement and error correction system 200 includes pressure sensor 202, temperature sensor 204, analog-to-digital converter 206, error-corrected pressure 208, offset parameter 210, pressure sensor voltage output 212, temperature difference output 214, and corrected offset value 216. Pressure sensor 202 receives offset parameter 210 as an input. Pressure sensor 202 outputs pressure sensor voltage output 212 which is proportional to a sensed pressure and contains an undesirable error term due to the thermocouple effect. Temperature sensor 204 outputs temperature difference output 214. Analog-to-digital converter 206 receives two inputs. The first input to analog-to-digital converter 206 is pressure sensor voltage output 212. The second input to analog-to-digital converter 206 is a combination of offset parameter 210 and temperature difference output 214, which combine to produce corrected offset value 216. Corrected offset value 216 is produced as a result of one or more error correction components modifying offset parameter 210 proportionally to temperature difference output 214. In some embodiments, the one or more error correction components comprise a network of resistors. Analog-to-digital converter 206 then produces error-corrected pressure 208 as an output.

Measurement and error correction system 200 functions by first receiving inputs from pressure sensor 202 and temperature difference sensor 204. Pressure sensor 202 receives a pressure input. In some embodiments, this is a differential pressure input. Pressure sensor 202 also receives offset parameter 210 as an input. In some embodiments, this is an offset voltage. Pressure sensor 202 produces pressure sensor voltage output 212. Pressure sensor voltage output 212 is a combination of the pressure signal measured and offset parameter 210. Thus, in some embodiments, pressure sensor voltage output 212 is a differential pressure measured as a voltage and offset by offset parameter 210 which is also a voltage value.

Temperature sensor 204 receives multiple inputs as temperature is measured at two or more different locations. Temperature sensor 204 produces temperature difference output 214. In some embodiments, temperature difference output 214 is a temperature difference based on multiple temperature measurements. In some embodiments, temperature difference output 214 is converted to a scaled voltage value.

Analog-to-digital converter 206 receives inputs from both pressure sensor 202 and difference temperature sensor 204. Pressure sensor voltage output 212 is fed directly as an input to analog-to-digital converter 206. A portion of the temperature difference output 214 combines with a portion of the offset parameter 210 as another input to analog-to-digital converter 206 where the weighting of offset parameter 210 and temperature difference output 214 are configured to be equal to the thermocouple error. The result of the combination of temperature difference output 214 and offset parameter 210 is corrected offset value 216. In some embodiments, this is a voltage value which is the scaled value of the temperature difference 214 and offset by the voltage of offset parameter 210. Analog-to-digital converter 206 performs a difference calculation on the two input signals and produces error-corrected pressure 208 as an output.

In some embodiments, temperature difference output 214 is zero where the temperature does not vary across pressure sensor 202. In such an embodiment, corrected offset value 216 is equal to offset parameter 210. Thus, in such an embodiment, the difference calculation performed by analog-to-digital converter 206 produces an error-corrected pressure 208 which is equal to the pressure signal measured at pressure sensor 202.

Figure 3:
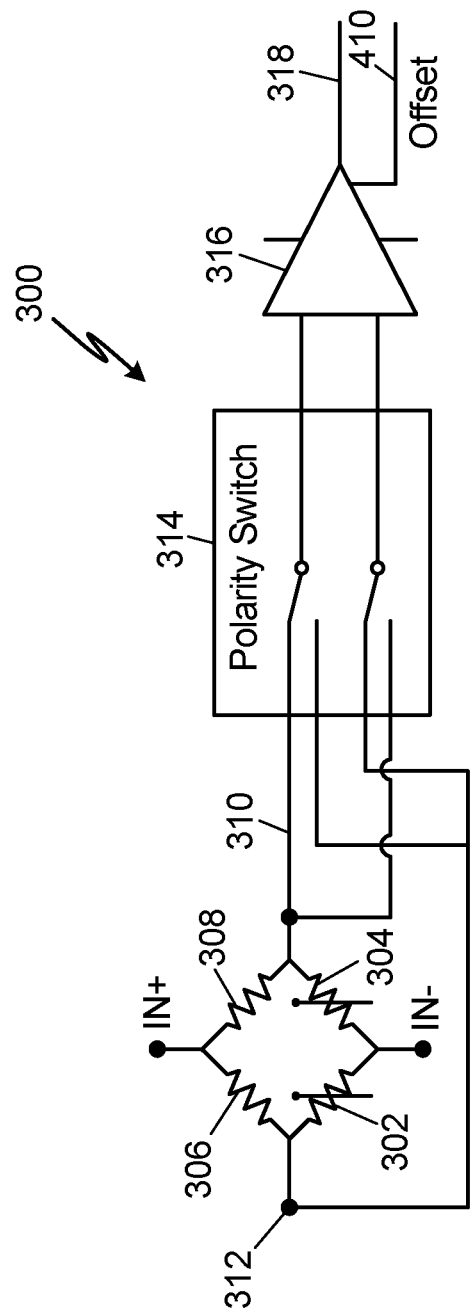
FIG. 3 is a circuit depicting a temperature measurement circuitry.

FIG. 3 is a circuit depicting difference temperature measurement circuitry 300. Difference temperature measurement circuitry 300 includes first temperature sensor 302, second temperature sensor 304, first temperature sensor resistor 306, second temperature sensor resistor 308, first temperature signal 310, second temperature signal 312, polarity switch 320, amplifier 316, and difference temperature output 318, and offset parameter 410. First temperature sensor 302 and second temperature sensor 304 are respectively connected to first temperature sensor resistor 306 and second temperature sensor resistor 308 in a voltage divider configuration. The voltage dividers produce first temperature signal 310 and second temperature signal 312, which are connected to polarity switch 320. The outputs of polarity switch 320 are connected to the inputs of amplifier 316. Amplifier 316 produces difference temperature output 318.

Figure 4:
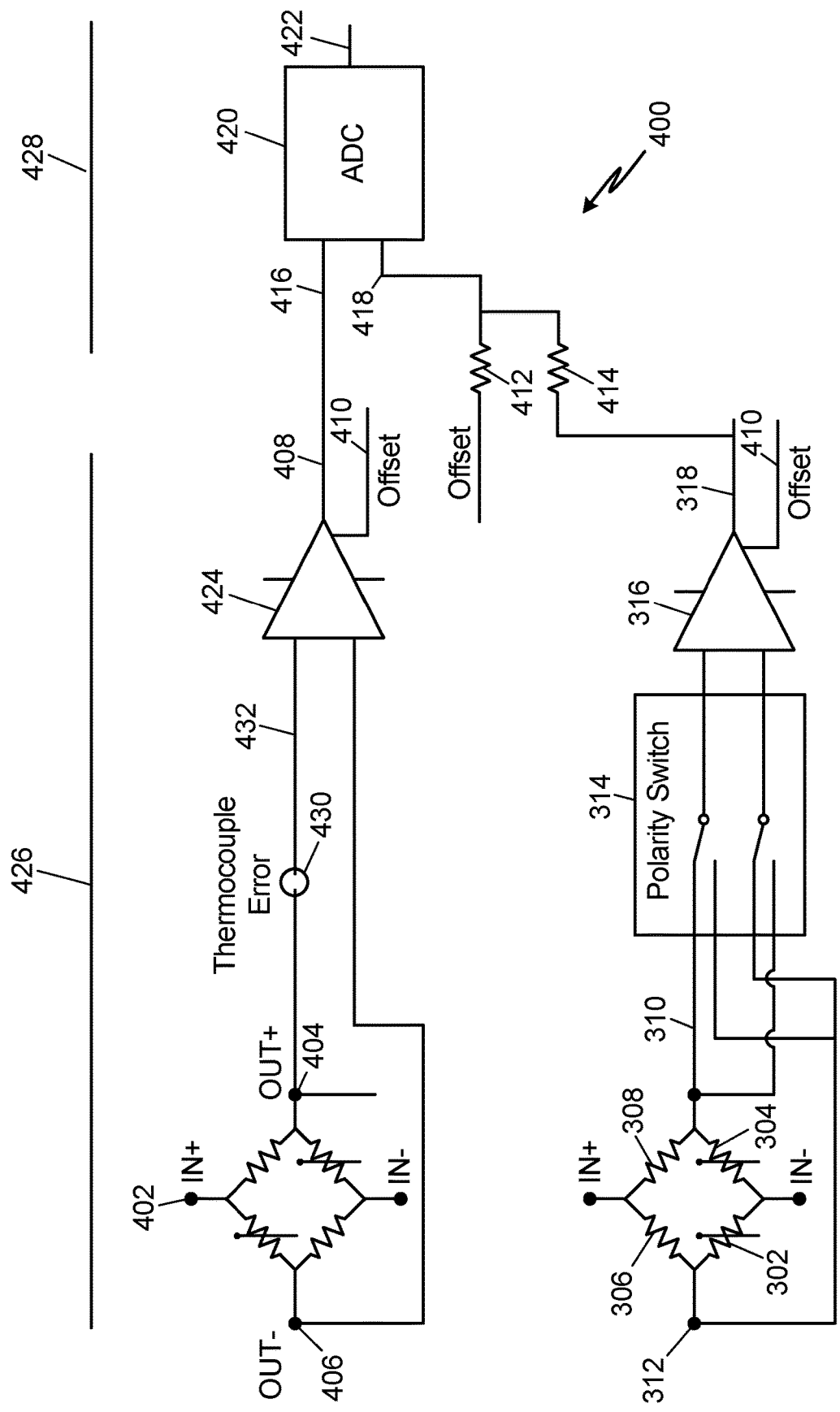
FIG. 4 is a circuit depicting a temperature measurement circuitry and pressure measurement and error correction circuitry.

First temperature sensor 302 and second temperature sensor 304 each obtain a temperature measurement reading of the surrounding area, such as the area near pressure sensors 102 or 202 as shown in FIGS. 1 and 2 or first differential pressure output 404, second differential pressure output 406 as shown in FIG. 4 and as discussed below. In some embodiments, first temperature sensor 302 and second temperature sensor 304 may be platinum resistance temperature detectors. The voltage divider circuit of first temperature sensor 302 and second temperature sensor 304 combined with first temperature sensor resistor 306 and second temperature sensor resistor 308 to produce first temperature signal 310 and second temperature signal 312. Polarity switch 320 may be configured to change the polarity of first temperature signal 310 and second temperature signal 312. In some embodiments, polarity switch 320 does not change the polarity of first temperature signal 310 or second temperature signal 312. In some embodiments, difference temperature measurement circuitry 300 does not contain polarity switch 320, and instead the user may adjust the polarity based on the configuration of inputs to amplifier 316.

FIG. 4 is a circuit depicting pressure measurement and error correction circuitry 400 and the difference temperature measurement circuitry 300 of FIG. 3. Pressure measurement and error correction circuitry 400 is made up of pressure measurement circuitry 426 and error correction circuitry 428. Pressure measurement circuitry 426 includes Wheatstone bridge 402, first differential pressure output 404, second differential pressure output 406, thermocouple error 430, amplifier input 432, amplifier 424, amplified pressure output 408, and offset parameter 410. Error correction circuitry 428 includes differential temperature output 318, first adjustment resistor 412, second adjustment resistor 414, first analog-to-digital converter input 416, second analog-to-digital converter input 418, analog-to-digital converter 420 (which is equivalent to analog-to-digital converter 206 in FIG. 2), and temperature corrected pressure output 422.

Wheatstone bridge 402 measures pressure. In other embodiments, other known circuit configurations may be used to measure pressure. Wheatstone bridge 402 produces first differential pressure output 404 and second differential pressure output 406. First differential pressure output 404 is subject to thermocouple error 430, and hence amplifier input 432 contains the undesirable error term. Second differential pressure output 406 is fed into amplifier 424 as an input. Amplifier 424 also takes offset parameter 410 as an input. In some embodiments, offset parameter 410 is a voltage value chosen by the circuit designer to offset the amplifier output. Amplifier 424 takes the difference between amplifier input 432 and second differential pressure output 406, amplifies the signal, and applies offset parameter 410 to produce amplified pressure output 408. As the thermocouple error has not yet been mitigated, amplified pressure output 408 may contain an undesirable error term.

Amplified pressure output 408 is fed directly into analog-to-digital converter 420 as first analog-to-digital converter input 416. Offset parameter 410 and first adjustment resistor 412 are placed in parallel with differential temperature output 318 and second adjustment resistor 414. First adjustment resistor 412 and second adjustment resistor 414 are chosen such that differential temperature output 318 has an appropriate adjustment impact on the offset parameter 410 based on the temperature difference applicable to the pressure sensor. The combination of offset parameter 410 and differential temperature output 318, scaled by first adjustment resistor 412 and second adjustment resistor 414 respectively, produces second analog-to-digital converter input 418.

Analog-to-digital converter 420 performs a difference operation on first analog-to-digital converter input 416 and second analog-to-digital converter input 418. Analog-to-digital converter 420 produces temperature corrected pressure output 422. Temperature corrected pressure output 422 is an adjusted pressure signal which mitigates the effect of a temperature gradient across a pressure sensor.

Figure 5:
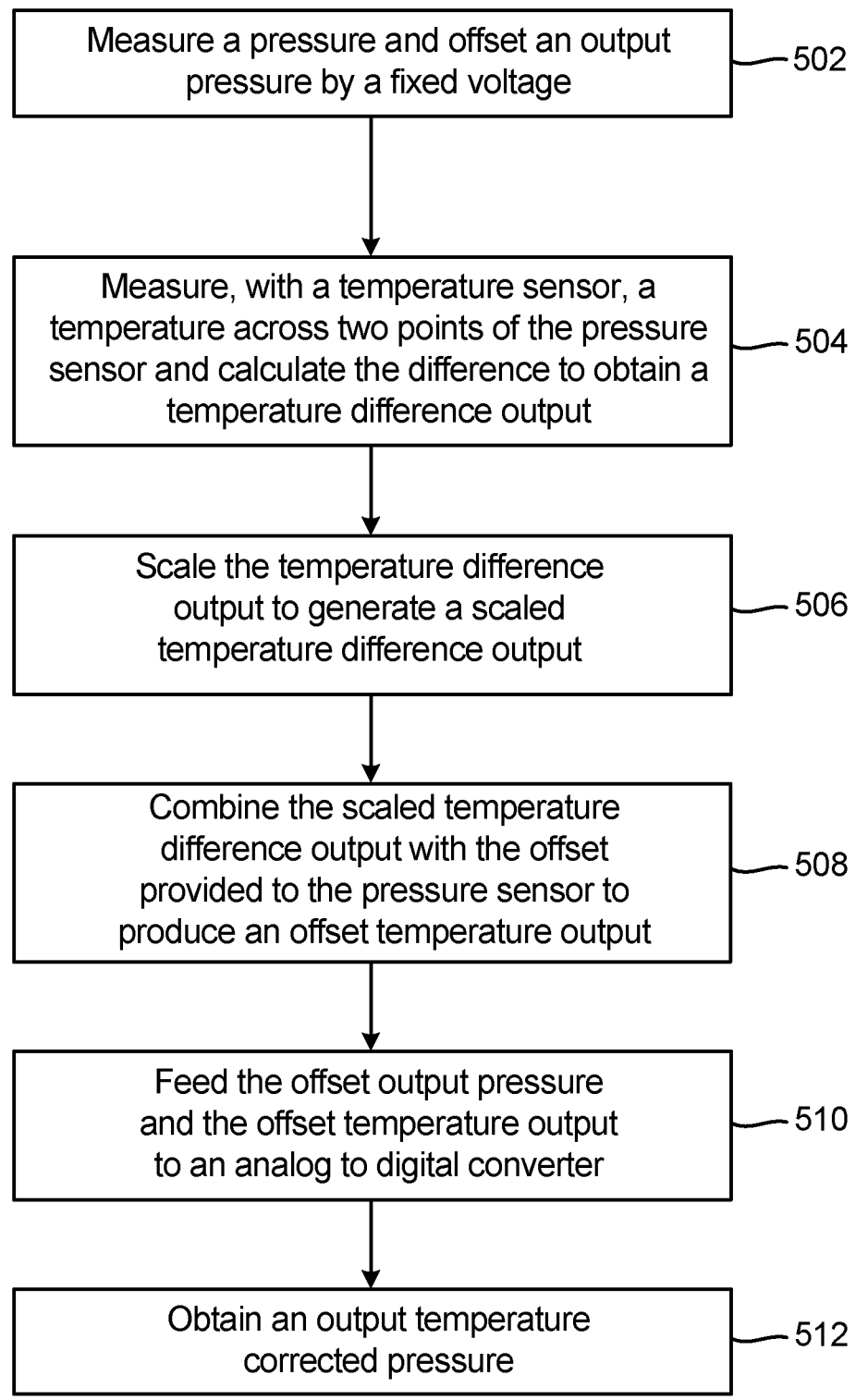
FIG. 5 is a method flowchart illustrating the steps of correcting the error of a pressure signal caused by a temperature difference.

FIG. 5 is a method flowchart illustrating the steps of correcting the error of a pressure signal caused by a temperature gradient. Method 500 begins at step 502 in which a pressure is measured and offset by a fixed voltage. At step 504, a temperature is measured across two points of the pressure sensor to obtain a temperature difference output. At step 506, the temperature output is scaled to generate a scaled temperature difference output. At step 508, the scaled temperature difference output is combined with the offset provided to the pressure sensor to produce an adjusted offset parameter output. At step 510, the offset output pressure and the adjusted offset output are fed to an analog-to-digital converter. Finally, at step 512, an output temperature corrected pressure is produced.

Discussion of Possible Embodiments

The following are non-exclusive descriptions of possible embodiments of the present invention.

Apparatus related to adjusting a pressure sensor reading based on a temperature difference across the pressure sensor. A pressure sensing system comprises a pressure sensor configured to produce a pressure sensor voltage output proportional to a sensed pressure output. The pressure sensing device also comprises a temperature sensor configured to measure a first temperature at a first location and a second temperature at a second location wherein the temperature sensor is configured to produce a first temperature difference signal based on the first temperature and the second temperature. The pressure sensing device also comprises one or more error correction components configured to modify the pressure output proportionally to the first temperature difference signal.

The system of the preceding paragraph can optionally include, additionally and/or alternatively, any one or more of the following features, configurations and/or additional components:

A further embodiment of foregoing system, wherein the sensed pressure output is determined based on a first differential pressure input and a second differential pressure input.

A further embodiment of foregoing system, wherein the one or more error correction components comprise a network of resistors.

A further embodiment of foregoing system, wherein an analog-to-digital converter receives the pressure sensor voltage output as a first input and the combination of a reference voltage and the first temperature difference signal as a second input.

A further embodiment of foregoing system, wherein the reference voltage is an offset voltage used to offset the voltage proportional to the sensed pressure output and the temperature difference signal.

A further embodiment of the foregoing system, wherein the temperature sensor further comprises one or more resistors having a pre-determined resistance/temperature relationship.

A further embodiment of the foregoing system, wherein the one or more resistors having a pre-determined resistance/temperature relationship are platinum resistance temperature detectors.

A further embodiment of the foregoing system, wherein the temperature sensor further comprises a network of resistors configured to change a polarity of the first temperature difference signal.

A further embodiment of the foregoing system, wherein the pressure sensor is a Wheatstone bridge configuration.

A further embodiment of the foregoing system, wherein the pressure sensor further comprises an amplifier configured to amplify a difference between a first differential pressure from the Wheatstone bridge configuration and a second differential pressure from the Wheatstone bridge configuration and apply an offset to produce the pressure output.

Some embodiments relate to a method for sensing pressure and compensating for a temperature difference across the pressure sensor. The method includes measuring a pressure output using a pressure sensor, measuring a first temperature at a first location and a second temperature at a second location using a temperature sensor wherein the temperature sensor is configured to produce a first temperature difference signal, and modifying the pressure output proportionally to the first temperature difference signal using one or more error correction components.

The system of the preceding paragraph can optionally include, additionally, and/or alternatively, any one or more of the following features, configurations, and/or additional components:

A further embodiment of the foregoing system, further comprising calculating the pressure output using a first differential pressure and a second differential pressure.

A further embodiment of the foregoing system, wherein the one or more error correction components comprise a network of resistors.

A further embodiment of the foregoing system, further comprising providing the pressure output as a first input to an analog-to-digital converter, and a combination of a reference voltage and the first temperature difference signal as a second input to the analog-to-digital converter.

A further embodiment of the foregoing system, further comprising selecting the reference voltage to be an offset voltage used to offset the pressure output and the temperature difference signal.

A further embodiment of the foregoing system, wherein the temperature sensor further comprises one or more resistors having a pre-determined resistance/temperature relationship.

A further embodiment of the foregoing system, wherein the one or more resistors having a pre-determined resistance/temperature relationship are platinum resistance temperature detectors.

A further embodiment of the foregoing system, further comprising changing a polarity of the first temperature difference signal via a network of resistors within the temperature sensor.

A further embodiment of the foregoing system, wherein the pressure sensor is a Wheatstone bridge configuration.

A further embodiment of the foregoing system, further comprising amplifying the difference between a first differential pressure from the Wheatstone bridge configuration and a second differential pressure from the Wheatstone bridge configuration and applying an offset to produce the pressure output.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A pressure sensing system comprising:
a pressure sensor configured to produce a pressure sensor voltage output proportional to a sensed pressure;
a temperature sensor configured to measure a first temperature at a first location and a second temperature at a second location;
wherein the temperature sensor is configured to produce a first temperature difference signal based on the first temperature and the second temperature; and
one or more error correction components configured to modify the pressure sensor voltage proportionally to the first temperature difference signal.

2. The pressure sensing system of claim 1, wherein the pressure sensor voltage output is determined based on a first differential pressure input and a second differential pressure input.

3. The pressure sensing system of claim 1, wherein the one or more error correction components comprises a network of resistors.

4. The pressure sensing system of claim 3, wherein an analog-to-digital converter receives the pressure sensor voltage output as a first input and the combination of a reference voltage and the first temperature difference signal as a second input.

5. The pressure sensing system of claim 4, wherein the reference voltage is an offset voltage used to offset the pressure sensor voltage output and the temperature difference signal.

6. The pressure sensing system of claim 1, wherein the temperature sensor further comprises one or more resistors having a pre-determined resistance to temperature relationship such that a temperature can be determined based on a resistance value of the one or more resistors.

7. The pressure sensing system of claim 6, wherein the one or more resistors having a pre-determined resistance/temperature relationship are platinum resistance temperature detectors.

8. The pressure sensing system of claim 1, wherein the temperature sensor further comprises a network of resistors configured to change a polarity of the first temperature difference signal.

9. The pressure sensing system of claim 1, wherein the pressure sensor is a Wheatstone bridge configuration.

10. The pressure sensing system of claim 9, wherein the pressure sensor further comprises an amplifier configured to amplify a difference between a first differential pressure from the Wheatstone bridge configuration and a second differential pressure from the Wheatstone bridge configuration and apply an offset to produce the pressure output.

11. A method for sensing pressure, the method comprising:
measuring a pressure output using a pressure sensor, wherein the pressure sensor produces a pressure sensor voltage output proportional to a sensed pressure;
measuring a first temperature at a first location and a second temperature at a second location using a temperature sensor;
wherein the temperature sensor is configured to produce a first temperature difference signal; and
modifying the pressure sensor voltage output proportionally to the first temperature difference signal using one or more error correction components.

12. The method of claim 11 further comprising, calculating the pressure output using a first differential pressure and a second differential pressure.

13. The method of claim 11 wherein the one or more error correction components comprise a network of resistors.

14. The method of claim 13 further comprising, providing the pressure sensor voltage as a first input to an analog-to-digital converter, and a combination of a reference voltage and the first temperature difference signal as a second input to the analog-to-digital converter.

15. The method of claim 14 further comprising, selecting the reference voltage to be an offset voltage used to offset the pressure sensor voltage and the temperature difference signal.

16. The method of claim 11, wherein the temperature sensor further comprises one or more resistors having a pre-determined resistance/temperature relationship.

17. The method of claim 16, wherein the one or more resistors having a pre-determined resistance/temperature relationship are platinum resistance temperature detectors.

18. The method of claim 11 further comprising, changing a polarity of the first temperature difference signal via a network of resistors within the temperature sensor.

19. The method of claim 11, wherein the pressure sensor is a Wheatstone bridge configuration.

20. The method of claim 19 further comprising, amplifying the difference between a first differential pressure from the Wheatstone bridge configuration and a second differential pressure from the Wheatstone bridge configuration and applying an offset to produce the pressure sensor.

* * * * *